UNITED STATES PATENT OFFICE.

MAX MOELLER, OF BERLIN, GERMANY, ASSIGNOR TO THE ACTIEN-GESELLSCHAFT FÜR ANILIN FABRIKATION, OF SAME PLACE.

BLUE AZO DYE.

SPECIFICATION forming part of Letters Patent No. 509,929, dated December 5, 1893.

Application filed October 22, 1892. Serial No. 449,648. (Specimens.)

*To all whom it may concern:*

Be it known that I, MAX MOELLER, doctor of philosophy, of Berlin, in the Kingdom of Prussia, German Empire, have invented new and useful Improvements in the Production of Blue Azo Dyes; and I do hereby declare that the following is a full, clear, and exact description of the invention which will enable others skilled in the art to which it appertains to make and use the same.

The invention relates to the production of new and valuable azo coloring matters, containing as component the 1:8 amidonaphtolmonosulfoacid, which may be prepared by melting with alkali the alphanaphtylaminedisulfoacid mentioned in the German Patent No. 40,571 and United States Patent No. 333,034, and possessing the following composition:

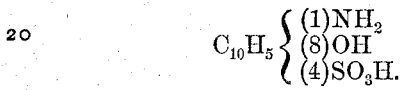

The amidonaphtolmonosulfoacids known up to the present yield, when combined with the tetrazo derivatives of paradiamines, either bluish black coloring-matters or bluish violet to red violet products of no practical value. I have now discovered that, on the contrary, by the combination of the aforesaid 1:8 amidonaphtolmonosulfoacid with the tetrazo derivatives of certain para-diamines coloring matters of high technical value are produced, which dye unmordanted cotton in an alkaline or salt-bath pure blue shades, and which are moreover with regard to their purity and greenish tint superior to the corresponding combination-products obtained with alphanaphtolsulfoacids and even with dihydroxynaphtalenesulfoacid S.

The following example will clearly show the manner of carrying out my invention. 24.4 kilograms diamidodiphenolether are converted into the tetrazo compound and the solution of the latter is poured into an alkaline solution of 52.2 kilograms 1:8 amidonaphtolmonosulfonate of sodium. A black blue precipitate is formed; after standing for some time the mixture is slightly heated and the coloring matter salted out, filtered, pressed and dried. The dyestuff forms an amorphous dark bronze-like powder; it dissolves easily in water with blue color, which is not changed by the addition of alkalies; the addition of mineral acids or acetic acid to this solution produces a dark-violet precipitate. The dyestuff is sparingly soluble in alcohol with blue color, insoluble in ether. In concentrated sulfuric acid it dissolves with a bluish-green shade; if this solution is diluted with water it turns at first blue-violet and then the free acid of the dyestuff separates in form of dark-violet flakes. The dyestuff dyes unmordanted cotton in an alkaline or neutral bath containing common salt or Glauber's salt a pure greenish blue; it may also be fixed on wool in a dye bath containing some salt.

The constitutional formula of the dyestuff is—

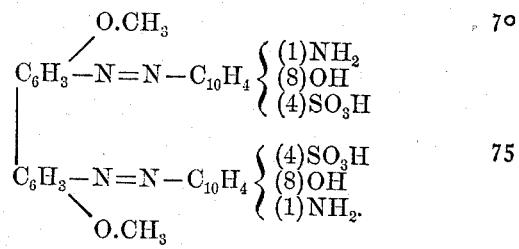

A similar product the shade of which is only slightly more violet blue is obtained by employing the tetrazo compound of tolidine.

In order to prepare mixed azo dyes I first combine the tetrazo derivative of diamidodiphenolether or of tolidine with one molecule of the 1:8 amidonaphtolmonosulfoacid in an alkaline solution and I react afterward with the intermediate product thus formed, which is a bluish black insoluble precipitate upon phenols, amines, amidophenols, or their sulfoacids or carbo-acids. For instance by combining the intermediate product resulting from 24.4 kilograms diamidodiphenolether and 26.1 kilograms amidonaphtolmonosulfonate of sodium with 24.6 alphanaphtolalphamonosulfonate of sodium a dyestuff is obtained, which dyes unmordanted cotton a pure blue shade.

Having now described my invention, what I claim is—

The blue azodyes derived from 1:8 amidonaphtolmonosulfonic acid and tetrazoditolyl or tetrazodiphenolether, and having the constitutional formula—

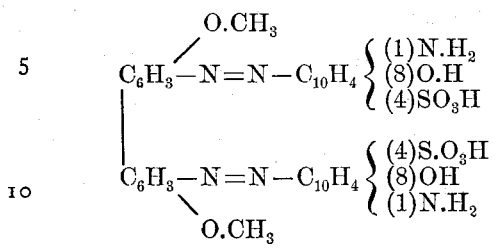

said dyes being soluble in water sparingly soluble in alcohol, insoluble in ether, dissolving with bluish green shade in strong sulfuric acid from which solution they are precipitated by water, substantially as hereinbefore described.

In testimony whereof I hereunto set my hand and affix my seal, in the presence of two witnesses, this 1st day of October, A. D. 1892.

MAX MOELLER. [L. S.]

Witnesses:
  REINHOLD SCHÖNBRODT,
  GUSTAV LUCHT.